United States Patent
Lindström et al.

(10) Patent No.: US 11,823,551 B2
(45) Date of Patent: Nov. 21, 2023

(54) DETECTING DISTURBING SOUND

(71) Applicant: Telefonaktiebolaget LM Ericsson (publ), Stockholm (SE)

(72) Inventors: Daniel Lindström, Luleå (SE); David Lindero, Luleå (SE); Tomas Frankkila, Luleå (SE); Min Wang, Luleå (SE); Medhat Mohamad, Luleå (SE); Stefan Wänstedt, Luleå (SE); Peter Ökvist, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/800,920

(22) PCT Filed: Feb. 21, 2020

(86) PCT No.: PCT/EP2020/054630
§ 371 (c)(1),
(2) Date: Aug. 19, 2022

(87) PCT Pub. No.: WO2021/164884
PCT Pub. Date: Aug. 26, 2021

(65) Prior Publication Data
US 2023/0083856 A1    Mar. 16, 2023

(51) Int. Cl.
*G08B 21/18*    (2006.01)
*H04M 1/72454*    (2021.01)

(52) U.S. Cl.
CPC ...... *G08B 21/182* (2013.01); *H04M 1/72454* (2021.01)

(58) Field of Classification Search
CPC .................................................. G08B 21/182
See application file for complete search history.

(56) References Cited

U.S. PATENT DOCUMENTS

| | | |
|---|---|---|
| 7,983,426 B2 | 7/2011 | Schuler et al. |
| 9,959,737 B2 | 5/2018 | Schulz et al. |

(Continued)

FOREIGN PATENT DOCUMENTS

| | | | |
|---|---|---|---|
| CN | 105874517 B | 10/2018 | |
| EP | 3506563 | * 12/2017 | ......... G10L 21/0232 |
| EP | 3506563 A1 | 7/2019 | |

OTHER PUBLICATIONS

Cano, Pedro, et al., "A Review of Algorithms for Audio Fingerprinting", 2002 IEEE Workshop on Multimedia Signal Processing, 2002, 169-173.

(Continued)

*Primary Examiner* — Hongmin Fan
(74) *Attorney, Agent, or Firm* — Murphy, Bilak & Homiller, PLLC (57) ABSTRACT

A first communications device (121) for detecting disturbing sound (101) is provided, operative to acquire a first representation of sound audible in a surrounding (120) of the first communications device, acquire, from second communications devices (111-114) which are spatially separated from the first communications device, second representations of sounds audible in the surroundings (110) of the second communications devices, and determine at least one second representation of sound which represents the same sound originating from the same source of sound. The first communications device is further operative to perform one or both of: i) if a sound level of a second representation of sound representing the same sound from the same source as the first representation of sound exceeds a first sound level threshold, and if the first communications device is proximate to the source of the sound, one or more of: trigger a notification to a user of the first communications device, reduce a volume of media played-out by the first communications device, and stop play-out of media by the first (Continued)

communications device, and ii) if a sound level of the first representation of sound exceeds a first sound level threshold, send a disturbance notification to the second communications device which is proximate to the source of the sound.

20 Claims, 4 Drawing Sheets

(56) References Cited

U.S. PATENT DOCUMENTS

2002/0145521 A1\* 10/2002 Chou .................... G08B 23/00
340/544
2018/0068535 A1 3/2018 Chun et al.

OTHER PUBLICATIONS

Wang, Avery Li-Chin, "An Industrial-Strength Audio Search Algorithm", 4th International Conference on Music Information Retrieval (ISMIR), 2003, 1-7.

\* cited by examiner

DETECTING DISTURBING SOUND

TECHNICAL FIELD

The invention relates to communications devices for detecting disturbing sound, methods for detecting disturbing sound, and corresponding computer programs, computer-readable storage media, and data carrier signals.

BACKGROUND

People which are occupying separate units in buildings, such as offices in office buildings or apartments in apartment buildings or other types of multi-family residential housing, may be disturbed by sounds which originate from other units in the same building. Such disturbing sounds may, e.g., originate from music, films, or other media, which is played out by loudspeakers in television sets, radios, or media players, people talking or dancing, and household appliances such as washing machines. Depending on the construction of a building, sound may travel through solid parts such as walls and pipes, or through air, e.g. through open doors and windows or ventilation systems.

A person which is disturbed by sound, the disturbed party, needs to identify the source of the sound and request the disturbing party to take measures to reduce the level of the disturbing sound, e.g., by discontinuing the activity which cause the disturbing sound, by reducing the volume of played-out media, by stopping the play-out of media, closing windows, and so forth.

From US 2018/0068535 A1, it is known to exchange state information between spatially apart neighbors in a building, which state information represents a degree of tolerance by neighbors over noise travelling between floors, in order to prevent neighborly dispute over noise travelling between floors in a mutually considerate, communicative and friendly manner.

U.S. Pat. No. 9,959,737 B2 discloses a noise detector and an analysis/alert engine which are configured to generate a noise score from a raw noise signal, the noise score being insufficient to reproduce a content of the raw noise signal, to determine if the noise score should cause an alert to be generated and a destination alert device for the alert, and to transmit an alert to the destination alert device.

SUMMARY

It is an object of the invention to provide an improved alternative to the above techniques and prior art.

More specifically, it is an object of the invention to provide improved solutions for detecting disturbing sound. In particular, it is an object of the invention to provide improved solutions for detecting a source of disturbing sound in multi-unit buildings, such as office buildings and apartment buildings.

These and other objects of the invention are achieved by means of different aspects of the invention, as defined by the independent claims. Embodiments of the invention are characterized by the dependent claims.

According to a first aspect of the invention, a first communications device for detecting disturbing sound is provided. The first communications device comprises a network interface and processing circuitry. The processing circuitry causes the first communications device to be operative to acquire a first representation of sound which is audible in a surrounding of the first communications device. The first communications device is further operative to acquire, from one or more second communications devices which are spatially separated from the first communications device, second representations of sounds which are audible in the surroundings of the one or more second communications devices. The first communications device is further operative to determine at least one second representation of sound, among the acquired second representations of sounds, which represents the same sound originating from the same source as the first representation of sound. The first communications device is further operative to, if a sound level of the at least one second representation of sound which represents the same sound originating from the same source as the first representation of sound exceeds a first sound level threshold, and if the first communications device is proximate to the source of the sound, one or more of: trigger a notification to a user of the first communications device, reduce a volume of media which is played-out by the first communications device, and stop play-out of media by the first communications device.

According to a second aspect of the invention, a first communications device for detecting disturbing sound is provided. The first communications device comprises a network interface and processing circuitry. The processing circuitry causes the first communications device to be operative to acquire a first representation of sound which is audible in a surrounding of the first communications device. The first communications device is further operative to acquire, from one or more second communications devices which are spatially separated from the first communications device, second representations of sounds which are audible in the surroundings of the one or more second communications devices. The first communications device is further operative to determine at least one second representation of sound, among the acquired second representations of sounds, which represents the same sound originating from the same source as the first representation of sound. The first communications device is further operative to, if a sound level of the first representation of sound exceeds a first sound level threshold, send a disturbance notification to the second communications device which is proximate to the source of the sound.

According to a third aspect of the invention, a method for detecting disturbing sound is provided. The method is performed by a first communications device and comprises acquiring a first representation of sound which is audible in a surrounding of the first communications device. The method further comprises acquiring, from one or more second communications devices which are spatially separated from the first communications device, second representations of sounds which are audible in the surroundings of the one or more second communications devices. The method further comprises determining at least one second representation of sound, among the acquired second representations of sounds, which represents the same sound originating from the same source as the first representation of sound. The method further comprises, if a sound level of the at least one second representation of sound which represents the same sound originating from the same source as the first representation of sound exceeds a first sound level threshold, and if the first communications device is proximate to the source of the sound, one or more of: triggering a notification to a user of the first communications device, reducing a volume of media which is played-out by the first communications device, and stopping play-out of media by the first communications device.

According to a fourth aspect of the invention, a method for detecting disturbing sound is provided. The method is performed by a first communications device and comprises acquiring a first representation of sound which is audible in a surrounding of the first communications device. The method further comprises acquiring, from one or more second communications devices which are spatially separated from the first communications device, second representations of sounds which are audible in the surroundings of the one or more second communications devices. The method further comprises determining at least one second representation of sound, among the acquired second representations of sounds, which represents the same sound originating from the same source as the first representation of sound. The method further comprises, if a sound level of the first representation of sound exceeds a first sound level threshold, sending a disturbance notification to the second communications device which is proximate to the source of the sound.

According to a fifth aspect of the invention, a computer program is provided. The computer program comprises instructions which, when the computer program is executed by a processor comprised in a communications device, cause the communications device to carry out the method according to an embodiment of the third or fourth aspect of the invention.

According to a sixth aspect of the invention, a computer-readable storage medium is provided. The computer-readable storage medium has stored thereon the computer program according to the fifth aspect of the invention.

According to a seventh aspect of the invention, a data carrier signal is provided. The data carrier signal carries the computer program according to the fifth aspect of the invention.

In the present context, "proximate", or being "in proximity" is to be understood as "very near" or "close". The invention makes use of an understanding that spatially separated communications devices may be utilized for detecting sound which exceeds a first sound level threshold in a certain location, and thereby is considered to be disturbing for humans or animals present in that location, and for determining a communications device which is proximate to the source of the disturbing sound. In response thereto, the communications device which is determined to be proximate to the source of the sound may then be caused to initiate one or measures for alleviating or mitigating the disturbance.

Even though advantages of the invention have in some cases been described with reference to embodiments of the first and second aspects of the invention, corresponding reasoning applies to embodiments of other aspects of the invention.

Further objectives of, features of, and advantages with, the invention will become apparent when studying the following detailed disclosure, the drawings and the appended claims. Those skilled in the art realize that different features of the invention can be combined to create embodiments other than those described in the following.

BRIEF DESCRIPTION OF THE DRAWINGS

The above, as well as additional objects, features and advantages of the invention, will be better understood through the following illustrative and non-limiting detailed description of embodiments of the invention, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

The invention will now be described more fully herein after with reference to the accompanying drawings, in which certain embodiments of the invention are shown. This invention may, however, be embodied in many different forms and should not be construed as limited to the embodiments set forth herein. Rather, these embodiments are provided by way of example so that this disclosure will be thorough and complete, and will fully convey the scope of the invention to those skilled in the art.

In the following, embodiments of the first communications device for detecting disturbing sound are described with reference to FIGS. 1 to 3. In the present context, sound is a vibration that typically propagates as an audible wave of pressure, through a transmission medium which may be gaseous, liquid or solid. Sound may include infrasound, which is sound at frequencies which are not perceptible to the human ear but can be felt by humans or animals through other senses and can also be detected by microphones. Disturbing sound may include sound which by a human listener, or an animal, is perceived as disturbing, unwanted, unpleasant, or disruptive to hearing, and is commonly also referred to as "noise". From a physics standpoint, noise or disturbing sound is indistinguishable from other sound. The difference arises when the human or animal brain receives and perceives a sound. In the present context, disturbing sound is understood to be sound having a sound level which exceeds a sound level threshold.

Figure 1:
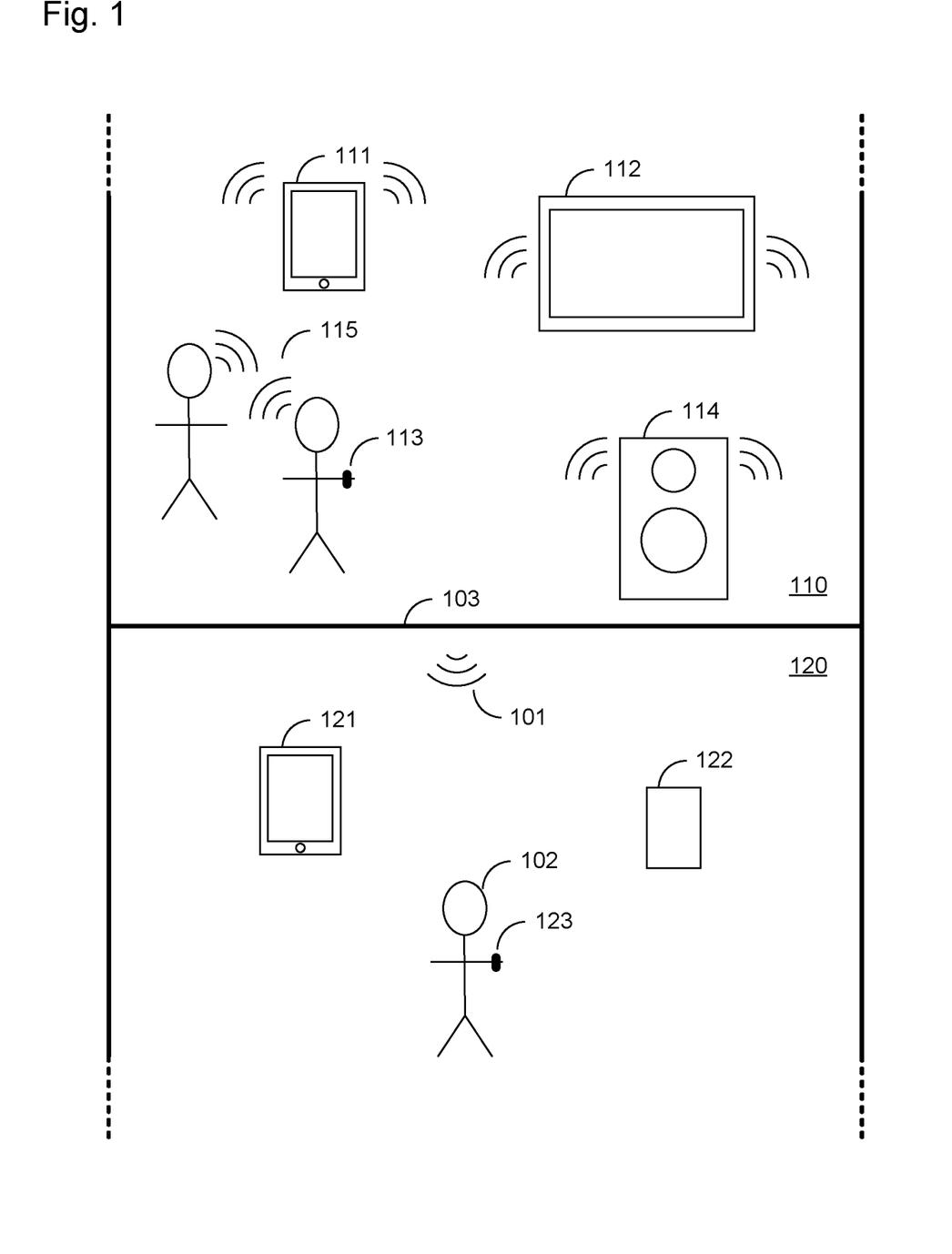
FIG. 1 exemplifies communications devices for detecting disturbing sound, in accordance with embodiments of the invention.

FIG. 1 illustrates a person 102 (the disturbed party) occupying a room 120, which may be located in an office building or an apartment building, who is disturbed by sound 101 which originates from a source, out of potentially several sources 111-115, of sound in another room 110 in the same, a connected, or a nearby building. The rooms 110 and 120 are spatially separated, e.g., by walls and/or by distance. The disturbing sound 101 (herein also referred to as "the sound") may, e.g., be caused by people talking 115, a smartphone 111 or a media player 114 (illustrated as a loudspeaker in FIG. 1) playing music, a television 112 playing audio of a movie or tv show, radios, or household appliances. In general, sound predominantly travels by propagation through solid parts of a building structure, such as walls (e.g., wall 103) and pipes, or through air, e.g., via open doors and windows or ventilation systems. Also located in the other room 110 are a smartphone 121, a home assistant 122, and a smartwatch 123, of the disturbed party 102.

Embodiments of the invention enable detecting disturbing sound, which is sound having a sound level exceeding a sound level threshold. This is achieved by utilizing communications devices, such as mobile phones, smartphones, User Equipments (UEs), tablet computers (tablets), laptops, media players, home assistants, Personal Digital Assistants (PDAs), televisions, and smartwatches, and the like, which are in spatially separated locations, based on similarities of representations of sounds which are audible in the surroundings of the respective communications devices. Throughout this disclosure, embodiments of the first communications device are described has being operative to detect disturbing sound based on first representations of sounds, which represent sounds which are audible in the surroundings of the first communications devices, and second representations of sounds, which represent sounds which are audible in the respective surroundings of the second communications devices. In other words, the first communications devices perform the role of acquiring representations of sounds, both first and second representations of sounds, analyzing these to detect disturbing sound, and initiate measures to alleviate or mitigate the disturbance in response to detecting disturbing sound. The second communications devices perform the role of providing second representations of sounds to the first communications device, and optionally receiving disturbance notifications from the first communications devices in response to which they may initiate measures to alleviate or mitigate the disturbance.

With further reference to the example illustrated in FIG. 1, two scenarios may be distinguished. In the present context, "proximate", or being "in proximity" is to be understood as "very near" or "close".

In a first scenario, the first communications device may be located in proximity of the source 111-115 of the disturbing sound, i.e., in the room 110. For instance, the first communications device may be embodied as the smartphone 111, the television 112, the smartwatch 113, or the media player 114. The second communications devices may, e.g., be located in the room 120. For instance, the second communications devices may be embodied as the smartphone 121, the home assistant 122, or the smartwatch 123. In this first scenario, the first communications device 111-114 may determine that it is in proximity of the source 111-115 of the disturbing sound, and initiate measures to alleviate or mitigate the disturbance, as is described further below.

Alternatively, in a second scenario, the first communications device may be in a location which is spatially separated from the source 111-115 of the disturbing sound, e.g., in the room 120. For instance, the first communications device may be embodied as the smartphone 121, the home assistant 122, or the smartwatch 123. The second communications devices are located in proximity of the source 111-115 of the disturbing sound, i.e., in the room 110. For instance, the second communications devices may be embodied as the smartphone 111, the television 112, the smartwatch 113, or the media player 114. In this second scenario, the first communications device 121-123 may determine that it is one of the second communications devices 111-114 which is in proximity of the source 111-115 of the disturbing sound, and notify the second communications device 111-114 which is in proximity of the source 111-115 of the disturbing sound, in response to which the second communications device 111-114 may initiate measures to alleviate or mitigate the disturbance, as is described further below.

Both the first and the second communications devices 111-114 and 121-123 may, e.g., be embodied as mobile phones, smartphones, UEs, tablets, laptops, media players, home assistants, PDAs, televisions, smartwatches, and the like.

Figure 2:
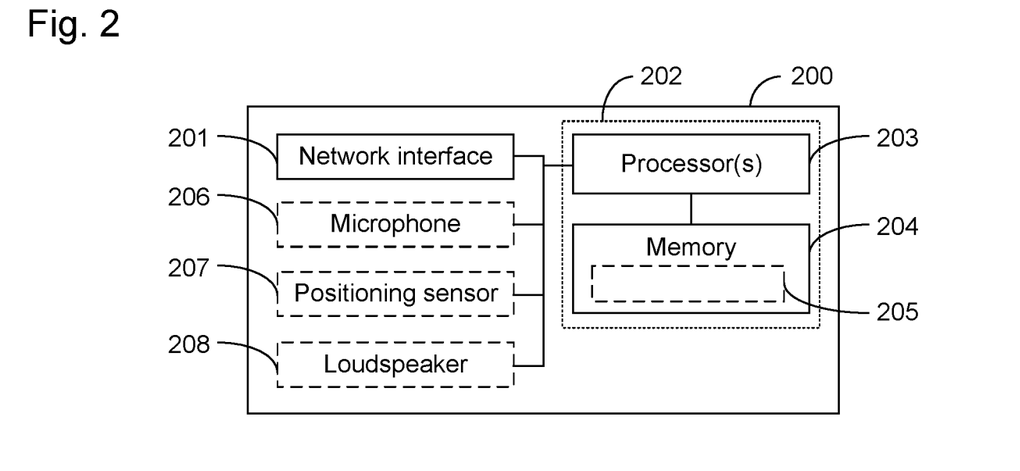
FIG. 2 schematically illustrates communications devices for detecting disturbing sound, in accordance with embodiments of the invention.
Figure 3:
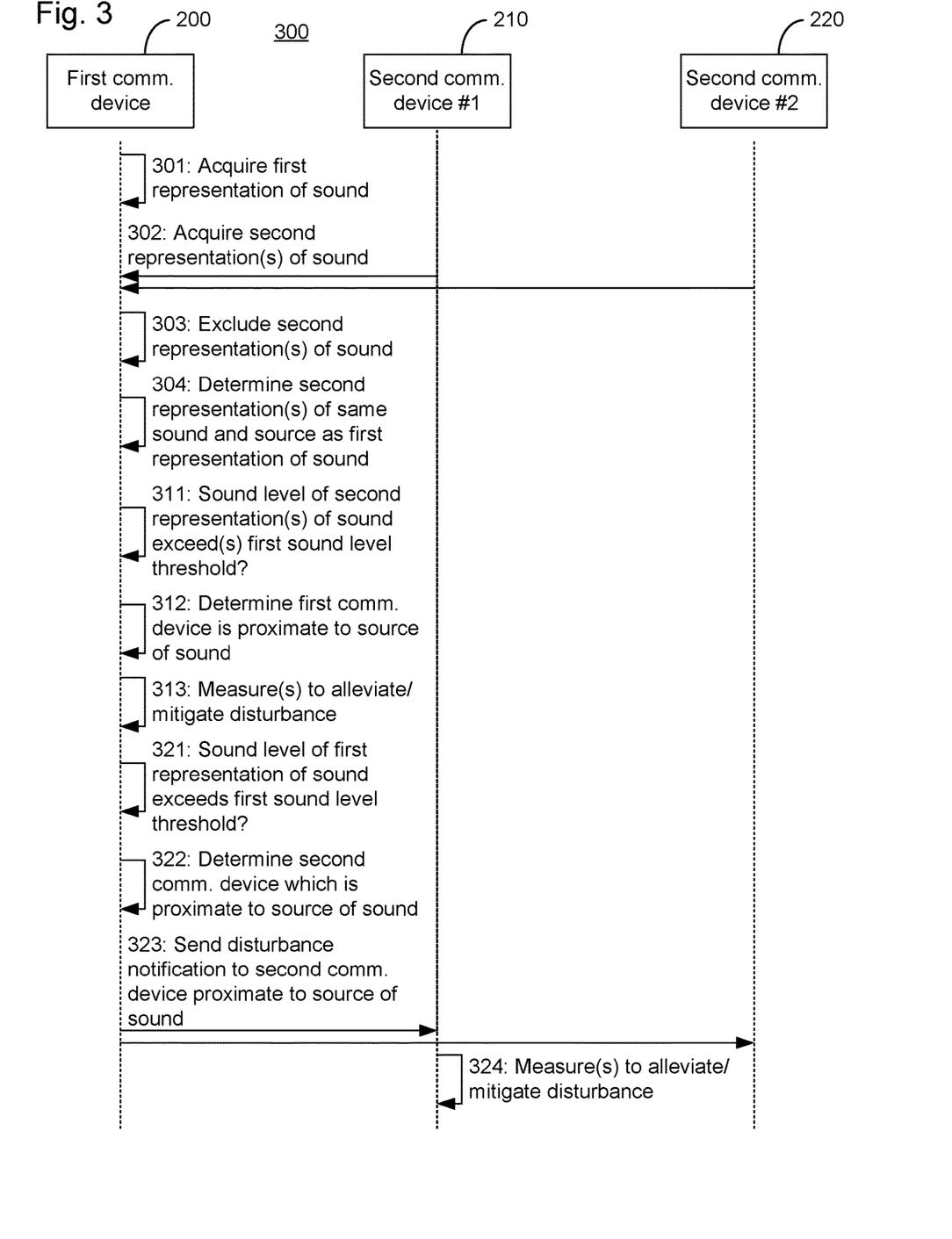
FIG. 3 shows a sequence diagram illustrating detecting disturbing sound, in accordance with embodiments of the invention.

In FIG. 2, an embodiment of the first communications device 200 is illustrated. The first communications device 200 comprises a network interface 201 and a processing circuitry 202. Reference is also made to FIG. 3, which shows a sequence diagram 300 illustrating detecting disturbing sound, in accordance with embodiments of the invention.

The network interface 201 is operative to support communications, i.e., exchange of data, with one or more other communications devices, e.g., second communications devices 210 or 220, either directly over via one or more communications networks, using any suitable protocol(s) over wired or wireless technologies. In particular, the network interface 201 may comprise one or more of an Ethernet interface circuitry, a cellular modem (e.g., GSM, UMTS, LTE, 5G, NR/NX), a WLAN/Wi-Fi modem, a Bluetooth modem, a Near-Field Communication (NFC) modem, or the like. Through the network interface 201, the first communications device 200 may receive second representations of sounds from one or more second communications devices 210 and 220 and, optionally, transmit disturbance notifications to a second communications devices 210 and 220, as is described further below.

The processing circuitry 202 causes the first communications device 200 to be operative to acquire 301 a first representation of sound which is audible in a surrounding of the first communications device 200. This may, e.g., be achieved by recording the sound using a microphone which is operatively connected to the first communications device 200. The microphone may either be comprised in the first communications device 200, such as the microphone 206, or be separate from the first communications device 200, e.g., a headset which is connected to the first communications device 200. Alternatively, the representation of sound which is audible in a surrounding of the first communications device 200 may be acquired 301 by generating the representation of sound based on media which is played-out by the first communications device 200, e.g., using one or more loudspeakers which are built-into, or connected to the first communications device 200. In this case, the first representation of sound can be generated based on coded audio data which is played-out by the first communications device 200, e.g., audio data which is obtained from a media server by downloading or streaming, or stored in a memory 204 of the first communications device 200.

In the present context, a representation of sound which is audible in the surrounding of a communications device, either the first 200 or a second communications device (such as second communications devices 210 and 220 in FIG. 3), may either by raw (uncompressed) audio data, compressed audio data, data representing spectral characteristics of the audible sound, data representing features of the audible sound, data representing an acoustic fingerprint of the audible sound, or the like. It will be appreciated that embodiments of the invention which rely on data representing spectral characteristics, features, or an acoustic fingerprint, of the audible sound are advantageous, in comparison which raw or compressed audio data, in that privacy of (potentially sensitive) audio recordings, which are transmitted form second communications devices 210/220 to the first communications device 200, is maintained.

The first communications device 200 is further operative to acquire 302, from the one or more second communications devices 210 and 220, second representations of sounds which are audible in the respective surroundings of the one or more second communications devices 210 and 220. Preferably, the one or more second communications devices 210 and 220 are spatially separated from the first communications device 200. For instance, as is described as the "first scenario" with reference to FIG. 1, the first communications device 200 may be located in the room 110 (i.e., the first communications device 200 may be any one of the communications devices 111-114), and at least one of the second communications devices 210 and 220 may be located in the room 120 (i.e., the second communications devices 210 and/or 220 may be any one or two of the communications devices 121-123). Alternatively, as is described as the "second scenario" with reference to FIG. 1, the first communications device 200 may be located in the room 120 (i.e., the first communications device 200 may be any one of the communications devices 121-123), and at least one of the second communications devices 210 and 220 may be located in the room 110 (i.e., the second communications devices 210 and/or 220 may be any one or two of the communications devices 111-114). It will be appreciated that one may envisage embodiments of the invention which detect disturbing sound based on a second representation of sound which is acquired from a second communications device 210 or 220 which is co-located with the first communications device 200.

Optionally, first communications device 200 may be operative to exclude 303 one or more second representations of sounds which are acquired 302 from the one or more second communications devices 210 and 220 as not being spatially separated from the first communications device 200 if their sound levels exceed a sound level threshold, herein referred to as the second sound level threshold. The second sound level threshold is typically higher than the first sound level threshold, introduced further below. In practice, this means that the one or more second communications devices 210 and 220 have been too close to the source of the sound when recording the audible sound, e.g., because they are in the same room as the source of the sound, resulting in a relatively high sound level of the second representations of sound.

The sound level of a representation of sound is to be understood to represent a relative, in relation to other representations of sound, or absolute, measure of the amplitude of the represented sound. If the representation of sound represents sound which has been recorded using a microphone, the sound level of such a representation of sound may advantageously be characterized by an absolute sound level, which is typically expressed in decibels (dBA). Optionally, the location of the recoding communications device (e.g., in a pocket) and/or a directionality of its microphone may be taken into consideration. If, on the other hand, the representation of sound is generated based on media which is played-out by a communications device, additional information pertaining to power amplifiers and loudspeakers, as well as a volume setting of the communications device, are required in order to derive an absolute sound level.

Alternatively, or additionally, the first communications device 200 may be operative to exclude 303 one or more second representations of sounds acquired 302 from the one or more second communications devices 210 and 220 as not being spatially separated from the first communications device 200 based on positioning information pertaining to a position of the first communications device 200 and positions of the one or more second communications devices 210 and 220. The positioning information is obtained from a positioning sensor 207 which is comprised in the first communications device 200, and from corresponding positioning sensors comprised in the second communications devices 210 and 220. The positioning sensors 207 are operative to provide positioning information which reflect respective in-door positions of the first 200 and the second communications devices 210 and 220. Such positioning information may, e.g., be based on WLAN SSIDs. More specifically, as two communications devices which are located in different apartments are likely connected to different WLAN or Wi-Fi networks, it can be determined that a second communications device 210 or 220 is spatially separated from the first communications device 200 if the WLAN SSID of a WLAN to which the second communications device 210 or 220 is connected differs from a WLAN SSID of a WLAN to which the first communications device 200 is connected.

The first communications device 200 is further operative to determine 304 at least one second representation of sound, among the acquired 302 second representations of sounds, which represents the same sound originating from the same source as the first representation of sound. In other words, the thereby determined at least one second representation of sound represents sound which originates from the same source as the first representation of sound. This may, e.g., be achieved based on similarities between the second representations of sounds and the first representation of sound exceeding a similarity threshold. In practice, each of the acquired 302 second representations of sounds, which has not been excluded 303 as not being spatially separated from the first communications device 200, is compared to the first representation of sound, and a level of similarity between the two representations of sounds is determined. A level of similarity between two representations of sounds may, e.g., be determined by calculating a correlation between the two representations, e.g., if the two representations comprise raw or compressed audio data of audible sound, either recorded using a microphone or derived from media which is played out by a communications device.

As an alternative, a level of similarity between two representations of sounds may be determined by comparing the frequency spectra of the two representations of sounds, or by identifying common characteristic features in their frequency spectra. In determining the level of similarity between the two frequency spectra, a change in the spectral characteristics of sound which has travelled through a wall may be taken into consideration. Typically, sound which travels through a wall has a considerably reduced energy in the high-frequency part of the spectrum.

As yet a further alternative, if the representations of sounds comprise acoustic fingerprints of the sounds, the first communications device 200 may be operative to determine 304 that a second representation of sound represents the same sound originating from the same source as the first representation of sound if their acoustic fingerprints match. Matching of acoustic fingerprints is oftentimes based on perceptual characteristics of the sound, which may include average zero crossing rates, estimated tempo, average spectrum, spectral flatness, prominent tones across a set of frequency bands, and bandwidth. Another common technique for matching of acoustic fingerprints is based on a comparison of time-frequency graphs called spectrograms. When creating a spectrogram, recorded audio is split into segments over time, and the result is a graph which plots three dimensions of audio: frequency vs amplitude (intensity) vs time. In the algorithm employed by Shazam, these graphs are analyzed to identify peaks which are labeled as "higher energy content". Further details about the Shazam algorithm can be found in "An Industrial-Strength Audio Search Algorithm", by A. Wang, 4th International Conference on Music Information Retrieval (ISMIR), 2003. Reference is also made to "A review of algorithms for audio fingerprinting", by P. Cano, E. Batle, T. Kalker, and J. Haitsma, 2002 IEEE Workshop on Multimedia Signal Processing, pages 169-173, IEEE, 2002.

The first communications device 200 may optionally be operative to exclude 303 one or more second representations of sounds acquired 302 from a second communications device 210 or 220 if the first communications device 200 is playing out media and the second communications device 210 or 220 is playing out the same media. In this way, it is avoided that second representations of sounds are determined to represent disturbing sound although the second communications device 210 or 220 itself is playing out the same media as the first communications device 200.

Depending on which of the two scenarios described hereinbefore with reference to FIG. 1 arises, i.e., either the first communications device 200 is proximate to the source of the disturbing sound (the "first scenario") or one of the second communications devices 210 and 220 is proximate to the source of the disturbing sound (the "second scenario"), the first communications device 200 may be operative to perform any one, or both, of the following actions.

As a first action, the first communications device 200 may be operative to, if a sound level of the at least one second representation of sound, which represents the same sound originating from the same source as the first representation of sound, exceeds 311 a first sound level threshold, and if the first communications device 200 is proximate to the source of the sound, one or more of the following measures 313 to alleviate or mitigate the disturbance: trigger a notification to a user of the first communications device 200, reduce a volume of media which is played-out by the first communications device 200, and stop play-out of media by the first communications device 200.

As a second action, the first communications device 200 may be operative to, if a sound level of the first representation of sound exceeds 321 a first sound level threshold, send a disturbance notification 323 to the second communications device 210 or 220 which is proximate to the source of the sound. Note that this is one of the at least one second communications devices from which second representations of sounds were acquired which represent the same sound originating from the same source as the first representation of sound. Optionally, the disturbance notification 323 may be configured to cause the second communications device 210 or 220 which is proximate to the source of the sound to initiate one or more of the following measures 324 to alleviate or mitigate the disturbance: trigger a notification to a user of the second communications device 210 or 220, reduce a volume of media which is played-out by the second communications device 210 or 220, and stop play-out of media by the second communications device 210 or 220.

Alternatively, the first communications device 200 may be operative to, if a sound level of the first representation of sound exceeds 321 a first sound level threshold, send a disturbance notification 323 to all second communications devices, not just the second communications device 210 or 220 which is proximate to the source of the sound. As yet a further alternative, the first communications device 200 may be operative to, if a sound level of the first representation of sound exceeds a first sound level threshold, send a disturbance notification to an authority or organization such as the police, the landlord, or the like.

The first communications device 200 may be operative to determine 311/321 if a sound level of a representation of sound, a first representation of sound or a second representation of sound, exceeds a first sound level threshold by comparing the sound level of the representation of sound to the first sound level threshold. The first sound level threshold may be configured by a manufacturer of the first or second communications devices or by their respective users. Accordingly, embodiments of the intention may utilize different first sound level thresholds for each one of the first communications device 200 and the one or more second communications devices 210 and 220. It will also be appreciated that the first sound levels may be dependent on weekdays and/or time-of-day. For instance, one may envision that a higher first sound level threshold is set during day times, e.g., between 7 a.m. and 10 p.m., and a lower first sound level threshold during night times. As a further example, the first sound level threshold may temporality be increased on weekends, Friday or Saturday nights, or during broadcasted events which are known to attract many listeners/viewers. Even further, the first sound level threshold may temporality be increased on request by a tenant to a landlord.

The first communications device 200 may be operative to determine 312/322 that a communications device, either the first communications device 200 or one of the second communications devices 210 and 220, is proximate to the source of the sound if the communications device is playing out media. This may, e.g., be indicated in the representation of sound which is acquired by the first communications device 200, or by means of information which is acquired from the communications device by separate signaling.

Alternatively, the first communications device 200 may be operative to determine that the communications device, of the first communications device 200 and the one or more second communications devices 210 and 220, from which the representation of sound having the highest sound level (i.e., the loudest sound) was acquired 301/302 is proximate to the source of the sound.

Preferably, a notification to a user of the first communications device 200 or the second communications device 210 or 220 which is proximate to the source of the sound is triggered if the first or second, respectively, representation of sound has been acquired by recording the sound using a microphone which is operatively connected to the communications device. For instance, this may be achieved by displaying a message to the user, providing a spoken notification, or by rendering a haptic notification, thereby making the user aware of the disturbance. Advantageously, the user, being proximate to the source of the disturbing sound, is made aware that she/he, someone in her/his proximity, or an apparatus in her/his proximity, is causing the disturbance and may act accordingly.

Preferably, a volume of media which is played-out by the first communications device 200 or the second communications device 210 or 220 which is proximate to the source of the sound is reduced if the first or second, respectively, representation of sound has been acquired by generating the representation of sound based on media which is played-out by the first or second communications device, respectively. Additionally or alternatively, the user of a communications device playing-out media, either the first communications device 200 or the second communications device 210 or 220, which has been determined to be the source of disturbing sound, may be made aware of a maximum playout volume level by means of a visual, audible, or haptic, feedback which is rendered when the user of the communications device attempts to change the playout volume. The maximum playout volume level may be set as an absolute value, e.g., in terms of dBA, or as a relative value in relation to how much the sound level of a representation of sound exceeds the first sound level threshold. For instance, if the sound level of a representation of sound exceeds the first sound level threshold by 20%, the maximum playout volume may be set to 20% below the current playout volume. Optionally, the maximum playout volume may be reduced even further, by additional 5%, to provide a safety margin in view of the dynamically changing volume of some types of music. Optionally, the disturbance notification which is sent 323 to the second communications device 210 or 220 which is proximate to the source of the sound may comprise information indicating to which extent the sound level of the first representation of sound exceeds the first sound level threshold.

For instance, a user-interface element which is displayed on a touchscreen of the communications device to enable the user to adjust a playout volume may change color, or display a colored scale, to indicate the maximum playout volume. As an example, the volume scale may indicate acceptable playout volumes in green color and playout volumes exceeding the maximum playout level using a red color. The displayed color may either be static or change dynamically depending on the volume setting.

As a further example, the communications device may play an audible notification to a user attempting to adjust the playout volume to a level which exceeds, or is about to exceed, the maximum playout volume.

As yet a further example, the communications device may provide a haptic feedback to a user attempting to adjust the playout volume to a level which exceeds, or is about to exceed, the maximum playout volume. For instance, the user may be notified, when approaching the maximum playout volume, by increasing a friction of the surface of the touchscreen, or by any other type of haptic feedback, e.g., a tap on the fingertip touching the user-interface element.

It will also be appreciated that embodiments of the invention may limit the playout volume of a communications device to the maximum playout volume, thereby preventing users from exceeding the maximum playout volume.

In the following, embodiments of the processing circuitry 202 which is comprised in the first communications device 200 for detecting disturbing sound are described with reference to FIG. 2. The processing circuitry 202 may comprise one or more processors 203, such as Central Processing Units (CPUs), microprocessors, application-specific processors, Graphics Processing Units (GPUs), and Digital Signal Processors (DSPs), or a combination thereof, and a memory 204 comprising a computer program 205 comprising instructions. When executed by the processor(s) 203, the computer program 205 causes the first communications device 200 to perform in accordance with embodiments of the invention described herein. The memory 204 may, e.g., be a Random-Access Memory (RAM), a Read-Only Memory (ROM), a Flash memory, or the like. The computer program 205 may be downloaded to the memory 204 by means of the network interface 201, as a data carrier signal carrying the computer program 205. The processor(s) 203 may further comprise one or more Application-Specific Integrated Circuits (ASICs), Field-Programmable Gate Arrays (FPGAs), or the like, which in cooperation with, or as an alternative to, the computer program 205 are operative to cause the first communications device 200 to perform in accordance with embodiments of the invention described herein. In addition, the processing circuitry 202 may comprise one or more interface circuits (not illustrated in FIG. 2) for controlling and/or receiving information from other components comprised in the first communications device 200, such as the network interface 201, a microphone 206, a positioning sensor 207, a loudspeaker 208, and any additional components which are comprised in the first communications device 200. The interface(s) may be implemented by any kind of electronic circuitry, e.g., any one, or a combination of, analogue electronic circuitry, digital electronic circuitry, and processing circuits executing a suitable computer program, i.e., software.

Figure 4:
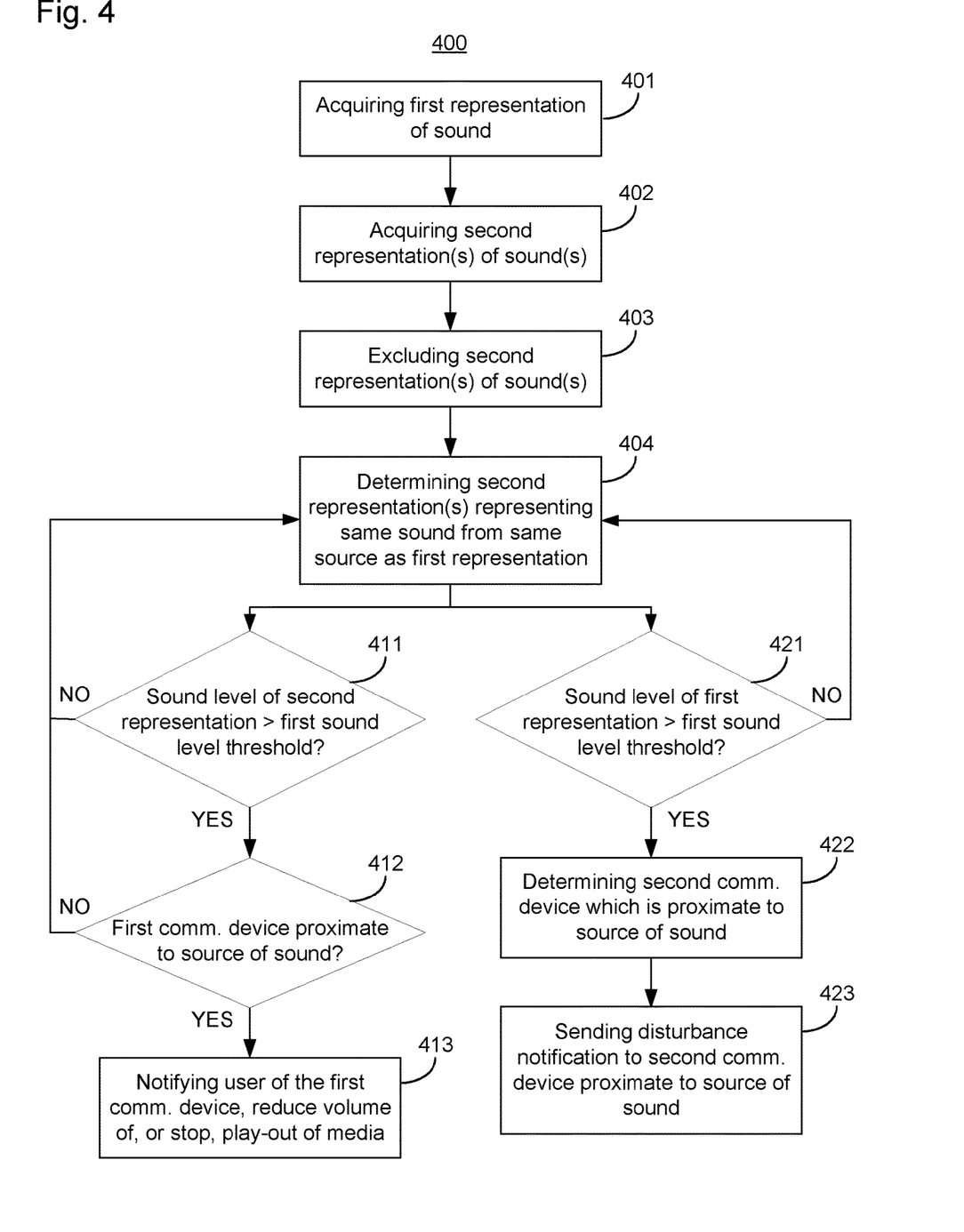
FIG. 4, shows a flow chart illustrating methods for detecting disturbing sound, in accordance with embodiments of the invention.

In the following, embodiments of the method 400 for detecting disturbing sound are described with reference to FIG. 4. The method 400 is performed by a communications device, such as the first communications device 200, and comprises acquiring 401 a first representation of sound which is audible in a surrounding of the first communications device, acquiring 402, from one or more second communications devices which are preferably spatially separated from the first communications device, second representations of sounds which are audible in the surroundings of the one or more second communications devices, and determining 404 at least one second representation of sound, among the acquired second representations of sound, which represents the same sound originating from the same source as the first representation of sound.

The method 400 further comprises one or more of the following actions.

As a first action, if a sound level of the at least one second representation of sound which represents the same sound originating from the same source as the first representation of sound exceeds 411 a first sound level threshold, and if the first communications device is proximate 412 to the source of the sound, one or more of 413: triggering a notification to a user of the first communications device, reducing a volume of media which is played-out by the first communications device, and stopping play-out of media by the first communications device.

As a second action, if a sound level of the first representation of sound exceeds 421 a first sound level threshold, sending 423 a disturbance notification to the second communications device which is proximate 422 to the source of the sound.

The determining 404 at least one second representation among the acquired second representations of sounds which represents the same sound originating from the same source as the first representation of sound may be based on similarities between the second representations of sounds and the first representation of sound exceeding a similarity threshold.

The method 400 may further comprise, if the first communications device is playing out media, excluding 403 second representations of sounds acquired from second communications devices which are playing out the same media.

A representation of sound which is audible in a surrounding of a communications device may be acquired 401/402 by recording the sound using a microphone which is operatively connected to the communications device.

Alternatively, a representation of sound which is audible in a surrounding of a communications device may be acquired 401/402 by generating the representation of sound based on media which is played-out by the communications device.

The method 400 may further comprise excluding 403 second representations of sounds acquired from the one or more second communications devices as not being spatially separated from the first communications device if their sound levels exceed a second sound level threshold.

The method 400 may further comprise excluding 403 second representations of sounds acquired from the one or more second communications devices as not being spatially separated from the first communications device based on positioning information pertaining to a position of the first communications device and positions of the one or more second communications devices.

The method 400 may further comprise determining 412/422 that a communications device is proximate to the source of the sound if the communications device is playing out media.

The method 400 may further comprise determining 412/422 that the communications device, of the first communications device and the one or more second communications devices, from which the representation of sound having the highest sound level was acquired is proximate to the source of the sound.

Optionally, the disturbance notification may be configured to cause the second communications device which is proximate to the source of the sound to one or more of: trigger a notification to a user of the second communications device, reduce a volume of media which is played-out by the second communications device, and stop play-out of media by the second communications device.

It will be appreciated that the method 400 may comprise additional, alternative, or modified, steps in accordance with what is described throughout this disclosure. An embodiment of the method 400 may be implemented as the computer program 205 comprising instructions which, when executed by the one or more processor(s) 203 comprised in the first communications device 200, cause the first communications device 200 to perform in accordance with embodiments of the invention described herein.

In alternative embodiment of the invention (not illustrated in FIG. 3), a network node for detecting disturbing sound may be envisaged, which comprises a network interface and processing circuitry, the processing circuitry causing the network node to be operative to acquire, from two or more second communications devices, second representations of sounds which are audible in the surroundings of the two or more second communications devices, and determine at least two second representations of sounds, among the acquired second representations of sounds, which represent the same sound originating from the same source. The network node is further operative to, if a sound level of a second representation of sound of the least two second representations of sounds which represent the same sound originating from the same source, exceeds the first sound level threshold, determine which of the corresponding at least two second communications devices is proximate to the source of the sound, and send a disturbance notification to the second communications device which is proximate to the source of the sound. Preferably, the determined second communications device which is proximate to the source of the sound is spatially separated from the second communications device from which the second representation of sound which exceeds the first sound level threshold has been acquired. Optionally, the disturbance notification may be configured to cause the second communications device which is proximate to the source of the sound to one or more of: trigger a notification to a user of the second communications device which is proximate to the source of the sound, reduce a volume of media which is played-out by the second communications device which is proximate to the source of the sound, and stop play-out of media by the second communications device which is proximate to the source of the sound.

The network node for detecting disturbing sound may further be operative to perform in accordance with embodiments of the first communications device 200 described throughout this disclosure.

Embodiments of the network device for detecting disturbing sound may, e.g., be deployed as central nodes in apartment buildings or the like.

The person skilled in the art realizes that the invention by no means is limited to the embodiments described above. On the contrary, many modifications and variations are possible within the scope of the appended claims.

The invention claimed is:

1. A first communications device for detecting disturbing sound, the first communications device comprising:
   a network interface, and
   processing circuitry causing the first communications device to be operative to:
      acquire a first representation of sound which is audible in a surrounding of the first communications device;
      acquire, from one or more second communications devices which are spatially separated from the first communications device, second representations of sounds which are audible in the surroundings of the one or more second communications devices;
      determine at least one second representation of sound, among the acquired second representations of sounds, which represents the same sound originating from the same source as the first representation of sound; and
      if a sound level of the at least one second representation of sound which represents the same sound originating from the same source as the first representation of sound exceeds a first sound level threshold, and if the first communications device is proximate to the source of the sound, do one or more of: trigger a notification to a user of the first communications device, reduce a volume of media which is played-out by the first communications device, and stop play-out of media by the first communications device.

2. The first communications device according to claim 1, further operative to, if a sound level of the first representation of sound exceeds the first sound level threshold, send a disturbance notification to the second communications device which is proximate to the source of the sound.

3. A first communications device for detecting disturbing sound, the first communications device comprising:
   a network interface; and
   processing circuitry causing the first communications device to be operative to:
      acquire a first representation of sound which is audible in a surrounding of the first communications device;
      acquire, from one or more second communications devices which are spatially separated from the first communications device, second representations of sounds which are audible in the surroundings of the one or more second communications devices;
      determine at least one second representation of sound, among the acquired second representations of sounds, which represents the same sound originating from the same source as the first representation of sound; and
      if a sound level of the first representation of sound exceeds a first sound level threshold, send a disturbance notification to the second communications device which is proximate to the source of the sound.

4. The first communications device according to claim 3, further operative to, if a sound level of the at least one second representation of sound which represents the same sound originating from the same source as the first representation of sound exceeds the first sound level threshold, and if the first communications device is proximate to the source of the sound, do one or more of: trigger a notification to a user of the first communications device, reduce a volume of media which is played-out by the first communications device, and stop play-out of media by the first communications device.

5. The first communications device according to claim 3, operative to determine at least one second representation among the acquired second representations of sounds which represents the same sound originating from the same source as the first representation of sound based on similarities between the second representations of sounds and the first representation of sound exceeding a similarity threshold.

6. The first communications device according to claim 3, further operative to, if the first communications device is playing out media, exclude second representations of sounds acquired from second communications devices which are playing out the same media.

7. The first communications device according to claim 3, wherein a representation of sound which is audible in a surrounding of a communications device is acquired by recording the sound using a microphone which is operatively connected to the communications device.

8. A method for detecting disturbing sound, being performed by a first communications device, and comprising:
acquiring a first representation of sound which is audible in a surrounding of the first communications device;
acquiring, from one or more second communications devices which are spatially separated from the first communications device, second representations of sounds which are audible in the surroundings of the one or more second communications devices;
determining at least one second representation of sound, among the acquired second representations of sounds, which represents the same sound originating from the same source as the first representation of sound; and
responsive to a sound level of the at least one second representation of sound which represents the same sound originating from the same source as the first representation of sound exceeding a first sound level threshold and the first communications device being proximate to the source of the sound, performing one or more of: triggering a notification to a user of the first communications device, reducing a volume of media which is played-out by the first communications device, and stopping play-out of media by the first communications device.

9. The method according to claim 8, further comprising, determining that a sound level of the first representation of sound exceeds the first sound level threshold, and sending a disturbance notification to the second communications device which is proximate to the source of the sound.

10. A method for detecting disturbing sound, being performed by a first communications device and comprising:
acquiring a first representation of sound which is audible in a surrounding of the first communications device;
acquiring, from one or more second communications devices which are spatially separated from the first communications device, second representations of sounds which are audible in the surroundings of the one or more second communications devices;
determining at least one second representation of sound, among the acquired second representations of sounds, which represents the same sound originating from the same source as the first representation of sound; and
responsive to a sound level of the first representation of sound exceeding a first sound level threshold, sending a disturbance notification to the second communications device which is proximate to the source of the sound.

11. The method according to claim 10, further comprising, responsive to a sound level of the at least one second representation of sound which represents the same sound originating from the same source as the first representation of sound exceeding the first sound level threshold and the first communications device being proximate to the source of the sound, performing one or more of: triggering a notification to a user of the first communications device, reducing a volume of media which is played-out by the first communications device, and stopping play-out of media by the first communications device.

12. The method according to claim 10, wherein the determining at least one second representation among the acquired second representations of sounds which represents the same sound originating from the same source as the first representation of sound is based on similarities between the second representations of sounds and the first representation of sound exceeding a similarity threshold.

13. The method according to claim 10, further comprising, if the first communications device is playing out media, excluding second representations of sounds acquired from second communications devices which are playing out the same media.

14. The method according to claim 10, wherein a representation of sound which is audible in a surrounding of a communications device is acquired by recording the sound using a microphone which is operatively connected to the communications device.

15. The method according to claim 10, wherein a representation of sound which is audible in a surrounding of a communications device is acquired by generating the representation of sound based on media which is played-out by the communications device.

16. The method according to claim 10, further comprising excluding second representations of sounds acquired from the one or more second communications devices as not being spatially separated from the first communications device if their sound levels exceed a second sound level threshold.

17. The method according to claim 10, further comprising excluding second representations of sounds acquired from the one or more second communications devices as not being spatially separated from the first communications device based on positioning information pertaining to a position of the first communications device and positions of the one or more second communications devices.

18. The method according to claim 10, further comprising determining that a communications device is proximate to the source of the sound if the communications device is playing out media.

19. The method according to claim 10, further comprising determining that the communications device, of the first communications device and the one or more second communications devices, from which the representation of sound having the highest sound level was acquired is proximate to the source of the sound.

20. The method according to claim 10, wherein the disturbance notification is configured to cause the second communications device which is proximate to the source of the sound to one or more of: trigger a notification to a user of the second communications device, reduce a volume of media which is played-out by the second communications device, and stop play-out of media by the second communications device.

\* \* \* \* \*